United States Patent
Song et al.

(10) Patent No.: US 11,261,949 B2
(45) Date of Patent: Mar. 1, 2022

(54) GEARBOX ASSEMBLY AND A HEADREST ACTUATOR COMPRISING THE SAME

(71) Applicant: GUANGDONG ZHAOQING L&V CO. LTD., Guangdong (CN)

(72) Inventors: Zhongming Song, Guangdong (CN); Aixing Li, Guangdong (CN)

(73) Assignee: GUANGDONG ZHAOQING L&V CO. LTD., Guangdong (CN)

( * ) Notice: Subject to any disclaimer, the term of this patent is extended or adjusted under 35 U.S.C. 154(b) by 538 days.

(21) Appl. No.: 16/305,350

(22) PCT Filed: Mar. 16, 2017

(86) PCT No.: PCT/CN2017/076920
§ 371 (c)(1),
(2) Date: Nov. 28, 2018

(87) PCT Pub. No.: WO2017/206569
PCT Pub. Date: Dec. 7, 2017

(65) Prior Publication Data
US 2020/0318717 A1     Oct. 8, 2020

(30) Foreign Application Priority Data
Jun. 2, 2016   (CN) .......................... 201610387329.7

(51) Int. Cl.
*F16H 57/039* (2012.01)
*F16H 25/20* (2006.01)
(Continued)

(52) U.S. Cl.
CPC ......... *F16H 25/2015* (2013.01); *B60N 2/829* (2018.02); *F16H 57/039* (2013.01);
(Continued)

(58) Field of Classification Search
CPC ......... B60N 2/829; F16H 57/039; F16H 1/16; F16H 2057/0213; F16H 2025/2031;
(Continued)

(56) References Cited

U.S. PATENT DOCUMENTS 5,144,849 A * 9/1992 Aihara ................. B60N 2/0224
                                         248/429
8,262,164 B2 * 9/2012 Ito .......................... B60N 2/933
                                        297/354.11

FOREIGN PATENT DOCUMENTS

CN      101680523 A     3/2010
CN      101844527 A     9/2010
(Continued)

OTHER PUBLICATIONS

International Search Report with Written Opinion for related Application No. PCT/CN2017/076920 dated Jun. 12, 2017 (14 Pages Including English Translation).

*Primary Examiner* — Randell J Krug
(74) *Attorney, Agent, or Firm* — Michael Best & Friedrich LLP (57) ABSTRACT

A gearbox assembly includes a housing, a cover, a screw rod inserted through the housing along a first direction, a worm wheel integrally formed on the screw rod, and a worm arranged in the housing along a second direction perpendicular to the first direction. The worm is driven into rotation by a driving shaft, so that the worm drives the worm wheel and the screw rod into rotation through a kinetic pair. The screw rod moves a lifting mechanism attached to the screw rod in a vertical direction through screw transmission. A stop pin is arranged on the housing and positioned in the direction of extension of a free end of the driving shaft of the worm against the free end.

14 Claims, 6 Drawing Sheets

(51) Int. Cl.
*B60N 2/829* (2018.01)
*F16H 57/02* (2012.01)

(52) U.S. Cl.
CPC .................. *F16H 2025/209* (2013.01); *F16H 2025/2031* (2013.01); *F16H 2057/02082* (2013.01)

(58) Field of Classification Search
CPC ........... F16H 2025/209; F16H 25/2015; F16H 2057/02082
See application file for complete search history.

(56) References Cited

FOREIGN PATENT DOCUMENTS

| | | | |
|---|---|---|---|
| CN | 102039835 A | | 5/2011 |
| CN | 102310789 A | | 1/2012 |
| CN | 102791518 A | | 11/2012 |
| CN | 202863201 U | * | 4/2013 |
| CN | 202863201 U | | 4/2013 |
| DE | 102006049808 B4 | | 2/2012 |
| KR | 101221269 B1 | * | 1/2013 |
| KR | 101221269 B1 | | 1/2013 |

\* cited by examiner

GEARBOX ASSEMBLY AND A HEADREST ACTUATOR COMPRISING THE SAME

FIELD OF THE INVENTION

The present invention relates to the field of actuator, in particular gearbox assembly of the actuator. In addition, the present invention relates to the headrest actuator comprising the gearbox assembly.

BACKGROUND OF THE INVENTION

Generally, the headrest on a car seat needs to be vertically adjustable in a convenient and comfortable way, so as to adaptively provide a most comfortable leaning position for people seated in the car with different bodysizes and sitting postures.

In the prior art, the vertical adjustment of the headrest is usually achieved via the cooperation between a transmission mechanism of a headrest actuator and a headrest mechanism. For example, according to patent document CN202863201U, a headrest actuator generally comprises a transmission mechanism with a worm wheel-and-screw rod and a headrest lifting seat, a power mechanism with a worm, and a headrest mechanism which is connected to the transmission mechanism so that the headrest can be moved up and down for vertical position adjustment. However, during vertical adjustment of the headrest, there are usually undesirable collisions/impacts between the transmission parts within the gearbox assembly for the headrest actuator due to uncontrollable fit clearance between the parts, resulting in strong vibration and noise. The user would experience the strong vibration with their head and hear the sharp noise during the adjustment, which detrimentally affects comfort and even driving safety.

Therefore, to reduce noise as much as possible while ensuring good operation performance of the actuator, better control is required for the fit clearance between the transmission parts of the headrest actuator, and axial or radial movement of the parts during operation shall be limited to achieve noise reduction and improved operation stability.

SUMMARY OF THE INVENTION

The present invention aims to provide a gearbox assembly having a compact structure, small runout of the screw rod, and low operation noise, and especially a headrest actuator comprising the gearbox assembly which allows more comfort for a seat user adjusting the headrest.

The first aspect of the present invention provides a gearbox assembly, which comprises a housing, a cover, a screw rod that is inserted into said housing along a first direction, a worm wheel integrally formed on said screw rod, and a worm arranged in the housing along a second direction perpendicular to the first direction, said worm being in meshing transmission with the worm wheel, wherein said worm is driven into rotation by a driving shaft, so that the worm drives said worm wheel and said screw rod into rotation through a kinetic pair; and said screw rod moves a lifting mechanism attached to the screw rod in a vertical direction through screw transmission; characterized in that a stop pin is arranged on said housing, said stop pin being positioned in the direction of extension of a free end of the driving shaft of the worm against the free end. Preferably, said stop pin is made of plastic material, and is fixed to said housing through screw thread.

According to one advantageous embodiment of the present invention, at least two positioning and mounting holes are further arranged for fixing the gearbox assembly to a fixed support, said positioning and mounting holes being arranged only on said housing. Advantageously, a fixation surface for said positioning and mounting holes is a certain distance above an upper surface of said cover; and more preferably, the fixation surface for said positioning and mounting holes is 0.5-1 mm above the upper surface of said cover.

According to another advantageous embodiment of the present invention, a front end of said screw rod protrudes from said housing, and a rear end of said screw rod is positioned inside said housing and faces said cover; wherein there is a stopper provided between the rear end of said screw rod and an inner surface of said cover. Advantageously, said stopper comprises a plastic washer and a rubber gasket.

In addition, said cover and said housing of the gearbox assembly according to the embodiment of the present invention are respectively arranged with a cover bushing and a housing bushing for rotationally supporting the screw rod.

The second aspect of the present invention provides a headrest actuator comprising said gearbox assembly. The headrest actuator according to the present invention will produce a noise no greater than 40 dBA during headrest adjustment, which can ensure best comfort of the seat user in the adjusting process.

BRIEF DESCRIPTION OF DRAWINGS

Through the following description with reference to the annexed drawings, the above and other features and advantages of the present invention will be more easily understood.

DETAILED DESCRIPTION OF EMBODIMENTS OF THE INVENTION

The present invention is further illustrated with the annexed drawings and specific embodiments that will be described in detail below.

Figure 1:
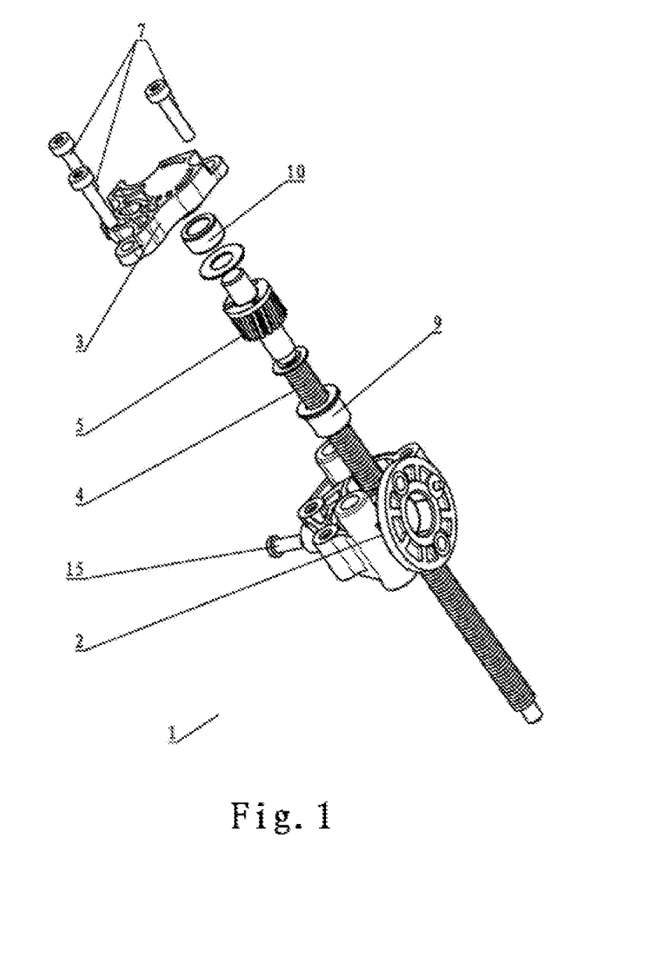
FIG. 1 is an exploded view of the gearbox assembly provided by the embodiment of the present invention, wherein the worm is not shown.
Figure 2A:
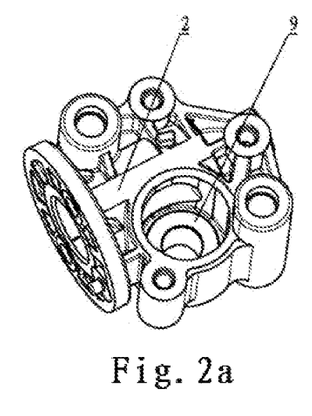
FIGS. 2a-2b show the housing bushing installed inside the gearbox housing respectively in a perspective view and in a sectional view.
Figure 2B:
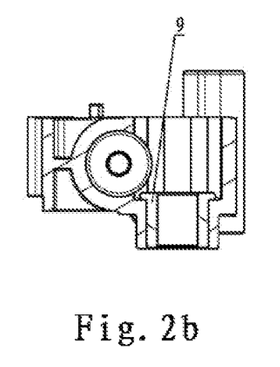
Figure 2C:
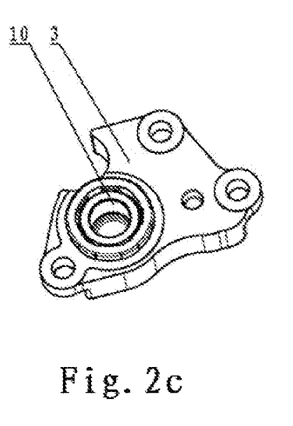
FIGS. 2c-2d show the cover bushing installed inside the gearbox cover respectively in a perspective view and in a sectional view.
Figure 2D:
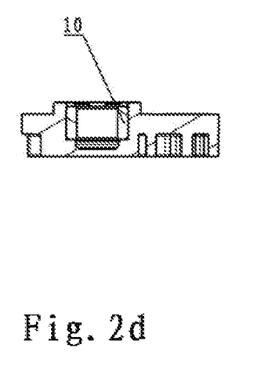

FIG. 1 shows a gearbox assembly 1 according to an embodiment of the present invention. As an example, the gearbox assembly 1 can be applied to a headrest actuator of a car seat and cooperate with a headrest mechanism to achieve vertical position adjustment of a headrest. More specifically, the gearbox assembly 1 comprises a housing 2, a cover 3, a screw rod 4 that is inserted through said housing 2 along a first direction, a worm wheel 5 integrally formed on said screw rod 4, and a worm 6 arranged in the housing 2 along a second direction (see FIG. 3), the worm 6 being in meshing transmission with the worm wheel 5. It is to be understood that, said first direction is preferably perpendicular to said second direction. The vertical lifting function of the headrest is fulfilled by the gearbox assembly for the headrest actuator through the following movements: said worm 6 is driven into rotation by a driving shaft (preferably a motor shaft 8); the worm 6 drives the worm wheel 5 and the screw rod 4, which are integrally formed, into rotation through a kinetic pair, wherein said worm wheel 5 and said screw rod 4 can be integrally formed with any known proper method in the art; said screw rod 4 moves a headrest lifting mechanism attached to the screw rod 4 in a vertical direction through screw transmission, so as to achieve vertical position adjustment of the headrest.

In the gearbox assembly according to the embodiment of the present invention, the housing 2 and the cover 3, as two independent parts, can be fixed to each other with screw connection or other proper means in the art. Preferably, the housing 2 and the cover 3 are fixed to each other through three fastening screws 7, as shown in FIG. 1. Said fastening screws 7 are preferably tapping screws, e.g. ST3.0×1.27.

Figure 4A:
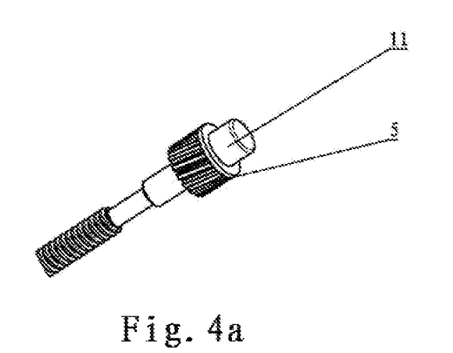
FIG. 4a is an assembling drawing of a worm wheel-screw rod sub-assembly according to one embodiment of the present invention, wherein the rear end of the screw rod is coated with a plastic material.
Figure 4B:
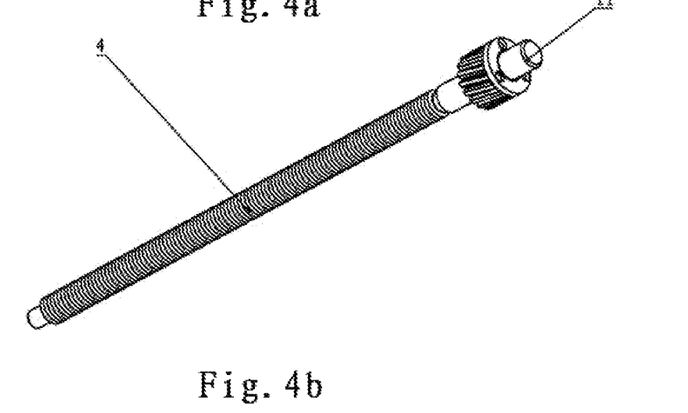
FIG. 4b is an assembling drawing of the worm wheel-screw rod sub-assembly according to one advantageous embodiment of the present invention, wherein the rear end of the screw rod is coated with no plastic material.

According to one embodiment of the present invention, a housing bushing 9 is arranged in the gearbox assembly 1 for rotationally supporting the screw rod 4, wherein the screw rod 4 is inserted through said housing 2 and extends into a non-through receiving hole in the cover 3, so that the cover 3 can directly and rotationally support the screw rod through said receiving hole. Preferably, in order to avoid direct contact between the metallic cover 3 and the metallic screw rod 4 that may lead to severe wear of the screw rod 4, a rear end 11 of the screw rod 4 is advantageously coated with a layer of wear-resistant plastic material (as shown in FIG. 4a), which alleviates wear of the screw rod in use. When the plastic material layer is severely worn out, it can be easily replaced with a new plastic coating.

It will be appreciated that, as the fit tolerance between plastic parts is much more difficult to precisely control than that between metal parts (generally, the two may differ dozens of times in terms of fit tolerance), when the cover 3 is also formed by injection molding, there would be a large fit clearance between the cover 3 and the plastic coating layer of the rear end of the screw rod 4, which may lead to loud noise. For this problem, the present invention further provides another advantageous embodiment: optionally, as shown in FIGS. 2a-2d, a cover bushing 10 is further arranged inside the cover 3, in addition to the housing bushing 9 inside the housing 2, so as to rotationally support the screw rod 4 respectively. Said housing bushing 9 and said cover bushing 10 can be separate members for example formed by injection molding of a wear-resistant material and press fit into corresponding receiving holes, or they may be integrally formed with the housing or cover by over-molding, or arranged in any other proper way. The housing bushing 9 and the cover bushing 10 can be e.g. made of wear-resistant materials with a self-lubricating property. It is to be noted that, in this embodiment, on one hand, plastic coating is no longer required for the rear end 11 of the screw rod to alleviate friction and reduce noise, since the cover bushing 10 is additionally arranged between a bare shaft section (i.e. the rear end without plastic coating) of the screw rod 4 and the cover 3, and on the other hand, as a metal surface of the bare shaft section of the screw rod 4 can directly rotationally fit with the cover bushing 10, a more precise clearance fit can be achieved between the two so as to minimize the fit tolerance and reduce the probability of collision caused by a large clearance between parts, thereby also reducing noise.

Table 1 shows several design parameters of the housing bushing 9 and the cover bushing 10 in one specific embodiment according to the present invention, wherein the fit tolerance between the inner diameter of the housing bushing 9 and the screw rod 4 is preferably controlled within the range of 0.005-0.02 mm, and that of the cover bushing 10 and the screw rod 4 is preferably controlled within the range of 0.075-0.095 mm.

TABLE 1

| | Inner diameter | Outer diameter | Screw rod diameter | Fit tolerance |
| --- | --- | --- | --- | --- |
| Housing bushing | Φ6.15 + 0.01/0.005 | Φ9.5 + 0.04/0.02 | Φ6.15 − 0.01/0 | 0.005~0.02 mm |
| Cover bushing | Φ6.22 + 0.015/0.005 | Φ9.5 + 0.04/0.02 | | 0.075~0.095 mm |

Figure 5:
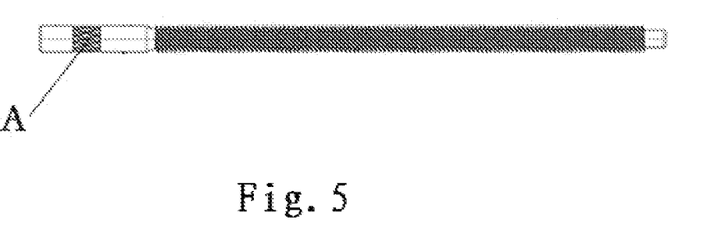
FIG. 5 shows the structure of the screw rod, wherein A is a position at which the worm wheel is wrapped.

Further, according to one advantageous embodiment of the present invention, in the case that there is no plastic coating on the rear end 11 of the screw rod (as shown in FIG. 5), the roundness and the concentricity of the screw rod can be precisely controlled to be 0.005 and 0.01 respectively.

Figure 3:
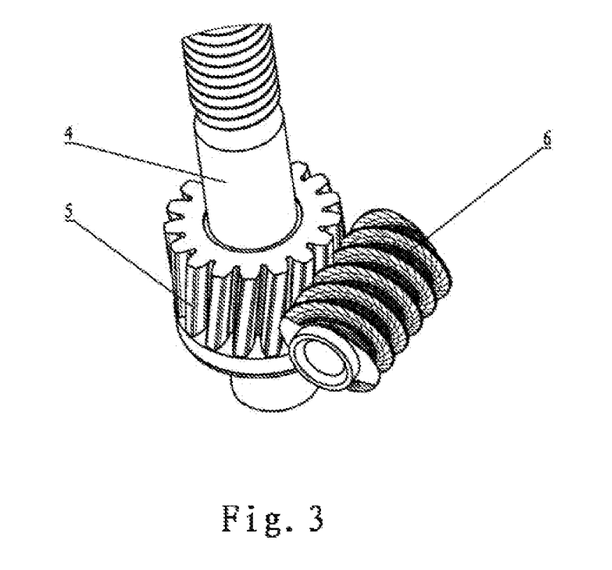
FIG. 3 shows the worm-and-worm wheel transmission in the embodiment of the present invention.

In the gearbox assembly of the embodiment of the present invention, a worm-and-worm wheel transmission is preferably adopted, as shown in FIG. 3. The worm-and-worm wheel transmission has advantages of large transmission ratio, good self-locking performance, and low operation noise and is particularly suitable for headrest actuator. During adjustment of headrest, movement is transferred through the worm-and-worm transmission to the screw rod 4 that is integrally formed with the worm wheel 5, so as to drive the rod into rotation, and in turn drive a headrest lifting mechanism (not shown in figures) attached to the screw rod 4 to move up and down, the position of the adjusted headrest being kept stable with the self-locking performance of the worm-and-worm wheel transmission. In one advantageous embodiment according to the present invention, the transmission ratio between the worm and the worm wheel is preferably 8.5.

In the embodiment shown in FIG. 1, the screw rod 4 and the worm wheel 5 are integrally formed, e.g. the worm wheel 5 can be over-molded on said screw rod 4. However, it shall be understood that the screw rod 4 and the worm wheel 5 can be formed as separate members, and coupled to each other by key connection or other proper connection means, so as to rotate together.

Figure 6A:
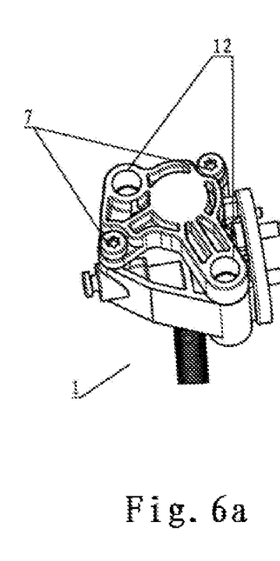
FIG. 6a illustrates the assembly state of the housing and the cover in a gearbox assembly in the prior art.

In an assembled structure of the housing and the cover in the prior art, as shown in FIG. 6a, both the housing and the cover are provided with positioning and mounting holes for fixing the gearbox assembly to a fixed support, e.g. a seat frame (not shown). In this way, the housing and the cover are fixed to each other with thread fasteners (preferably fastening screws 7) for fixing the cover 3 and the housing 2 and fasteners (not shown) in the positioning and mounting holes 12. Too many fasteners can easily cause deformation of the cover 3. And it is to be understood that the deformation resulted from fixation can cause noise and affect the operation performance of the actuator. For this problem, in one advantageous embodiment of the present invention shown in FIG. 6b, at least two positioning and mounting holes 12 provided in the gearbox assembly 1 for fixing the assembly to the seat frame are only arranged in the housing, and the cover is fixed to the housing only with the fastening screws 7. The fasteners in the positioning and mounting holes 12 do not penetrate through the cover, so as to reduce the possibility of the noise production due to the cover deformation caused by fixation.

Figure 6B:
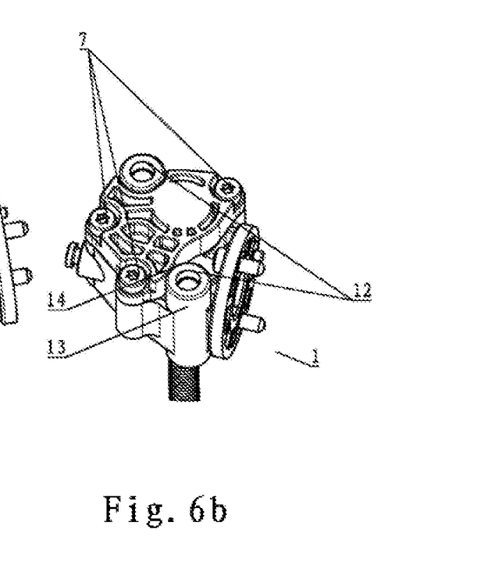
FIG. 6b illustrates the assembly state of the housing and the cover in a gearbox assembly according to one advantageous embodiment of the present invention.

Preferably, two protrusions 13 comprising two positioning and mounting holes 12 are arranged on said housing 2, and recesses 14 for adaptively receiving said two protrusions 13 are correspondingly arranged on said cover 3. Advantageously, the protrusions 13 and the recesses 14 are not in contact, that is, there is a certain gap between the two. It will be appreciated that the number of the positioning and mounting holes and that of the corresponding protrusions and recesses can be determined according to actual requirements. Advantageously, a fixation surface for said two positioning and mounting holes 12 is a certain distance above an upper surface of said cover 3 (i.e. the face of the cover opposite to the abutment face of the cover 3 and the housing 2). Preferably, the distance is comprised between 0.5 mm and 1 mm, and more preferably, the distance is 0.6 mm. Advantageously, the height difference between the fixation surface for the positioning and mounting holes 12 and the upper surface of the cove 3 can further avoid the deformation influence of fixation on the cover 3, so as to reduce noise and provide better system operation stability. It shall be noted that the fixation surface for said positioning and mounting holes on the housing 2 refers to a surface of the housing that has the same orientation with the upper surface of the cover 3.

Figure 7A:
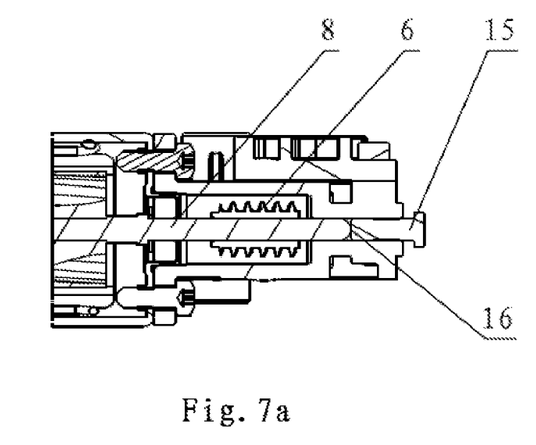
FIGS. 7a-7c are illustrations for play control of a motor shaft.
Figure 7B:
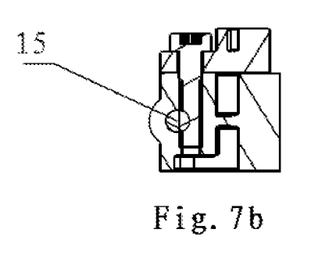
Figure 7C:
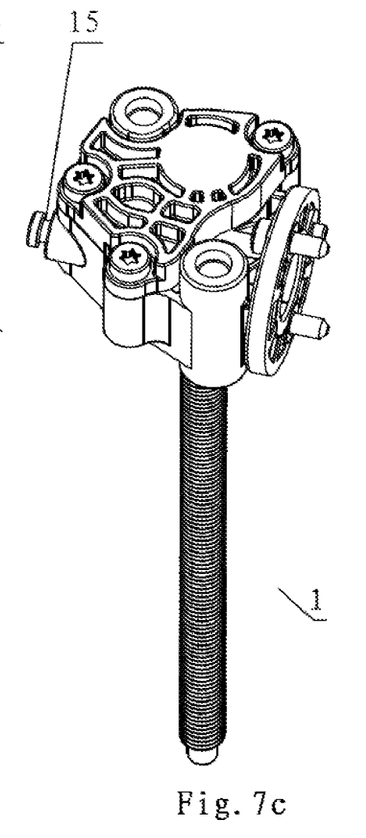

According to another advantageous embodiment, as shown in FIGS. 7a-7c, a stop pin 15 is further arranged on said housing 2 and positioned in the direction of extension of a free end (i.e. the end away from the motor) of a driving shaft of the worm 6 against the free end, for controlling an axial play of the driving shaft (e.g. motor shaft 8) coupled to the worm 6. During the vertical position adjustment of the headrest with the headrest actuator, the switching for moving directions of the headrest is fulfilled by rotation direction switching of the motor. However, axial movement of the motor shaft 8 due to the uncontrolled axial play thereof in the known designs, which is more obvious in motor direction switching, causes loud noise due to collisions of parts, which discomforts the seat user during the adjustment of the headrest. Therefore, "zero play" of the motor shaft is crucial for reducing the operation noise of the actuator. As shown in FIG. 7b, said stop pin 15 is preferably fixed to the housing 2 by screw thread, and abuts against a rear end 16 of the motor shaft 8 after being screwed into the housing 2 for a certain distance, so as to control the axial play of the motor shaft. It is understandable that, with such threaded connection, the position of the stop pin can be adaptively adjusted, so that for various gearbox assemblies wherein the axial play of motor shaft varies, the stop pin 15 can always be set to abut against the free end of the corresponding motor shaft 8 within a certain axial adjustment range, so as to ensure "zero play" of the motor shaft in different gearbox assemblies.

Preferably, said stop pin 15 is made of a plastic material, which preferably has a certain amount of elastic deformation. This can avoid high-pitched noise caused by collision of metal materials. Said plastic material may be e.g. PA66+ GF30 (ALCOM PA66 910/1 GF30 M02).

Figure 8:
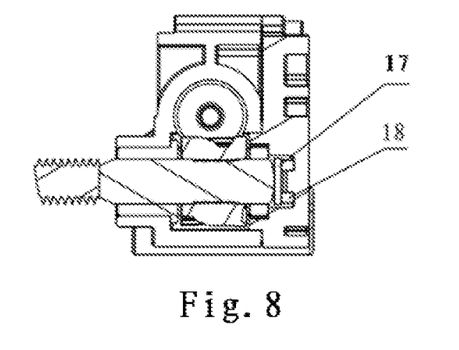
FIG. 8 is an illustration for play control of the rear end of the screw rod with a control means.

In another advantageous embodiment, a control means for controlling the play of the rear end of the screw rod is further arranged, as shown in FIG. 8. In the prior art, the rear end 11 of the screw rod is in direct contact with the cover 3, which results in an axial movement of the screw rod 4 during rotation caused by the inevitable fit clearance, or even a collision with the cover, generating a noise. However, in the present invention, the front end of said screw rod protrudes from said housing, and the rear end of said screw rod is positioned within said housing and faces said cover. A stopper is arranged between the rear end 11 of said screw rod and an inner surface of the cover 3 as a play control means for the rear end of the screw rod, which can greatly reduce noise. Specifically, as shown in FIG. 8, a plastic washer is arranged at the rear end of said screw rod along with a rubber gasket 18, wherein the rubber gasket 18 is installed in a receiving hole in the cover 3, and the plastic washer is clamped between the rubber gasket 18 and the rear end of the screw rod, so that the elastic deformation of the rubber gasket 18 can complement the play of the screw rod 4, thereby providing better control of the play of the rear end 11 of the screw rod. In one advantageous embodiment, the rubber gasket 18 is e.g. an annular ring, which is sleeved on a boss arranged within the receiving hole for reliable positioning. The plastic washer may be e.g. flat washer 17.

Through the above structural designs of the parts and play control means for the specific parts (e.g. motor shaft, screw rod), low noise during operation of the gearbox assembly can be achieved, the noise being advantageously not greater than 40 dBA. Noise is an important parameter for the seat user in application of the gearbox assembly to headrest actuator for vertical position adjustment of the headrest. The gearbox assembly according to the embodiments of the present invention can provide best comfort to the seat user when used for headrest adjustment, and it improves safety as the driver's operation is more reliable because of enhanced comfort during driving and prevents high-pitched noise when the seat user is adjusting the headrest as well.

It is to be noted that, this description and the embodiments disclosed shall be considered as illustrative, and the present invention is not limited by these embodiments. A person skilled in the art can make various modifications and variants to the embodiments disclosed above without departing from the scope or spirit of the present invention. And the true extent of the present invention is defined by the claims and their equivalents.

What is claimed is:

1. A gearbox assembly comprising:
   a housing;
   a cover;
   a screw rod that is inserted through the housing along a first direction;
   a worm wheel integrally formed on the screw rod; and a worm arranged in the housing along a second direction perpendicular to the first direction, wherein the worm is driven into rotation by a driving shaft such that the worm drives the worm wheel and the screw rod into rotation through a kinetic pair, wherein the screw rod moves a lifting mechanism attached to the screw rod in a vertical direction through screw transmission, wherein a stop pin is arranged on the housing, the stop pin positioned in the direction of extension of a free end of the driving shaft against the free end, wherein at least two positioning and mounting holes are arranged for fixing the gearbox assembly to a fixed support, the positioning and mounting holes arranged only on the housing, and wherein when the cover is coupled to the housing, a fixation surface for the positioning and mounting holes is distanced from an upper surface of the cover.

2. The gearbox assembly according to claim 1, wherein the stop pin is made of a plastic material.

3. The gearbox assembly according to claim 1, wherein the stop pin is fixed to the housing through a screw thread.

4. The gearbox assembly according to claim 1, wherein the fixation surface for the positioning and mounting holes is distanced 0.5-1 mm from the upper surface of the cover.

5. The gearbox assembly according to claim 1, wherein the cover and the housing are respectively arranged with a cover bushing and a housing bushing for rotationally supporting the screw rod.

6. A headrest actuator comprising the gearbox assembly according to claim 1.

7. The gearbox assembly according to claim 1, wherein a front end of the screw rod protrudes from the housing, and a rear end of the screw rod is positioned inside the housing and faces the cover, and wherein a stopper is between the rear end of the screw rod and an inner surface of the cover.

8. The gearbox assembly according to claim 7, wherein the stopper comprises a plastic washer and a rubber gasket.

9. A gearbox assembly comprising:
a housing;
a cover for the housing;
at least two positioning and mounting holes arranged for fixing the gearbox assembly to a fixed support, the positioning and mounting holes arranged only on the housing;
a screw rod insertable through the housing along a first direction;
a worm wheel coupled to the screw rod; and
a worm arranged in the housing along a second direction perpendicular to the first direction,
wherein the worm is driven into rotation by a driving shaft such that the worm drives the worm wheel and the screw rod into rotation through a kinetic pair,
wherein the screw rod moves a lifting mechanism attached to the screw rod in a vertical direction through screw transmission, and
wherein when the cover is coupled to the housing, a fixation surface for the positioning and mounting holes is distanced from an upper surface of the cover.

10. The gearbox assembly of claim 9, wherein the fixation surface is a surface of the housing having the same orientation as the upper surface of the cover when the cover is coupled to the housing.

11. The gearbox assembly of claim 9, wherein when the cover is coupled to the housing, the fixation surface for the positioning and mounting holes is distanced 0.5-1 mm from the upper surface of the cover.

12. A headrest actuator comprising the gearbox assembly of claim 9.

13. A gearbox assembly comprising:
a housing;
a cover for the housing;
a screw rod insertable through the housing along a first direction;
a worm wheel coupled to the screw rod; and
a worm arranged in the housing along a second direction perpendicular to the first direction,
wherein the worm is driven into rotation by a driving shaft such that the worm drives the worm wheel and the screw rod into rotation through a kinetic pair,
wherein the screw rod moves a lifting mechanism attached to the screw rod in a vertical direction through screw transmission,
wherein a front end of the screw rod protrudes from the housing, and a rear end of the screw rod is positioned inside the housing and faces the cover,
wherein a stopper is between the rear end of the screw rod and an inner surface of the cover, and
wherein the stopper comprises a plastic washer and a rubber gasket.

14. A headrest actuator comprising the gearbox assembly of claim 13.

* * * * *